N. W. JAMESON.
WATER POWER APPLIANCE.
APPLICATION FILED OCT. 18, 1911.

1,029,127.

Patented June 11, 1912.
2 SHEETS—SHEET 1.

Witnesses:
Isabella Jameson
William A. Warrington

Inventor:
Nelson W. Jameson

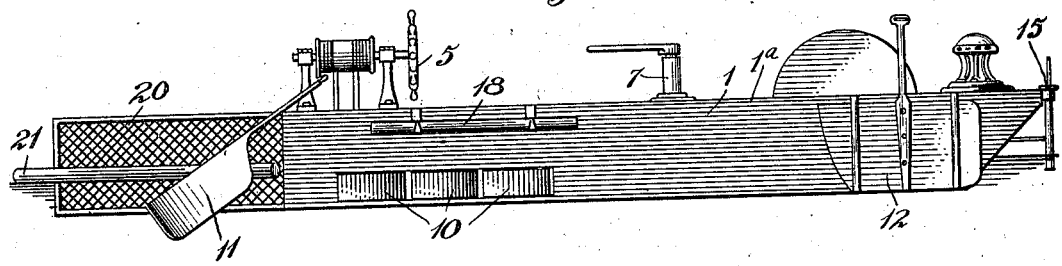
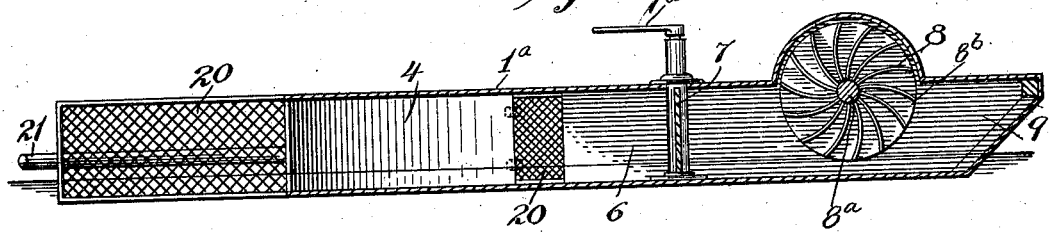
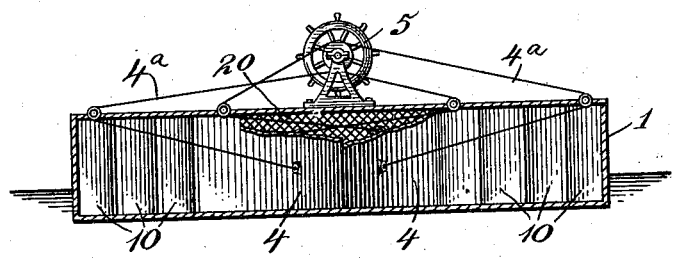

UNITED STATES PATENT OFFICE.

NELSON W. JAMESON, OF GEORGETOWN, DELAWARE.

WATER-POWER APPLIANCE.

1,029,127.  Specification of Letters Patent.  Patented June 11, 1912.

Application filed October 18, 1911.  Serial No. 655,427.

*To all whom it may concern:*

Be it known that I, NELSON W. JAMESON, a citizen of the United States, residing at Georgetown, in the county of Sussex and State of Delaware, have invented certain new and useful Improvements in Water-Power Appliances, of which the following is a specification.

My invention has relation to an appliance for intercepting and concentrating the natural flow of a body of water for generating power therefrom for being utilized by such appliance in operating electric lighting, machinery or other plants.

Figure 1:
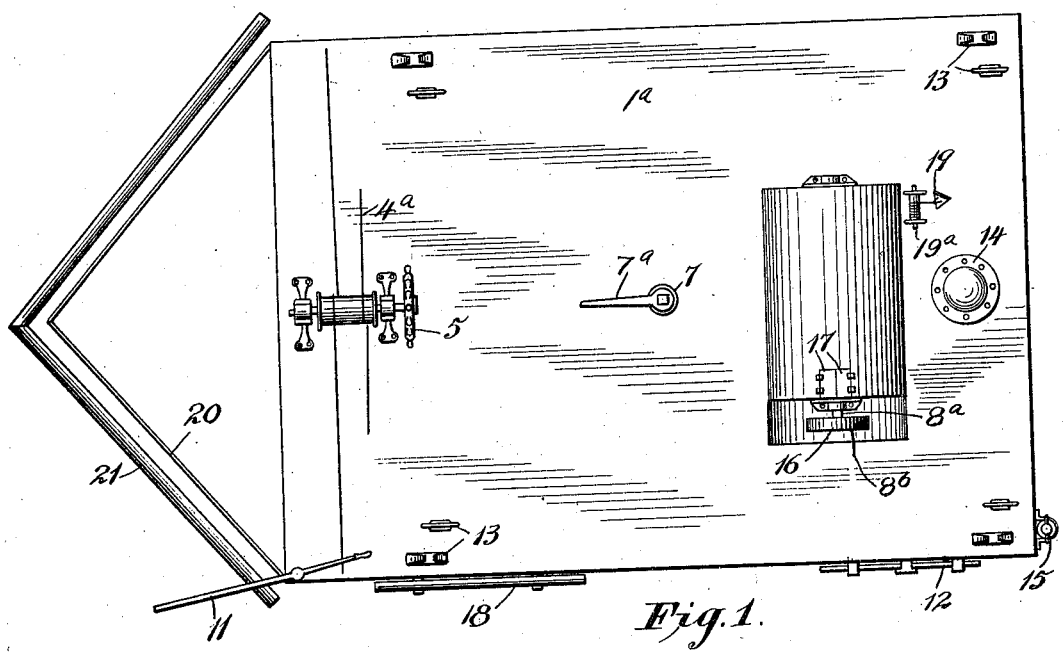
Figure 2:
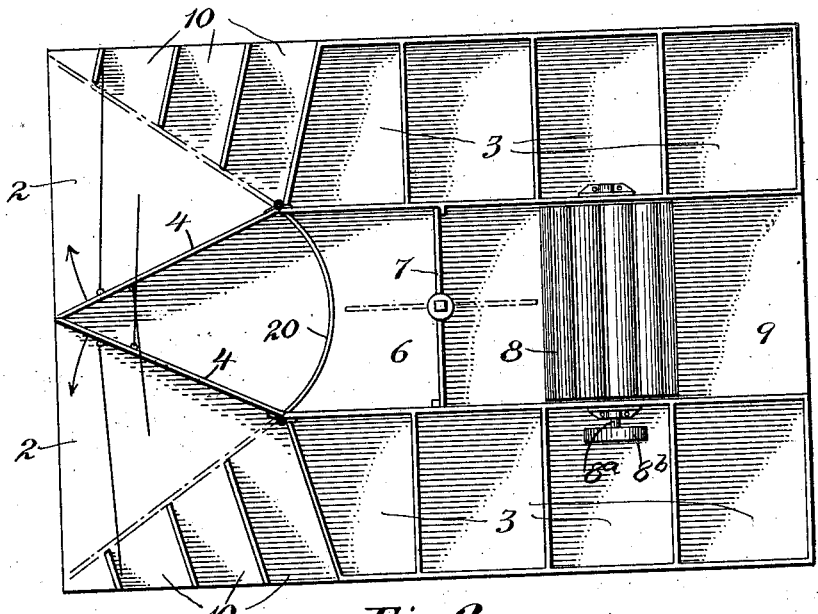

The nature, scope and characteristic features of my invention will be more fully understood from the following description taken in connection with the accompanying drawings forming part hereof, in which—
Figure 1, is a top or plan view of an intercepting appliance for generating power from the natural flow of a body of water and utilizing the same, embodying main features of my said invention. Fig. 2, is a central sectional view, showing the internal constructive arrangement thereof. Fig. 3, is a side elevational view. Fig. 4, is a vertical longitudinal central sectional view; and Fig. 5, is a transverse sectional view of the wing mechanism in the front portion of the appliance of Fig. 1, showing the actuating means thereof.

Referring to the drawings 1, is the foundation, hull or barge provided internally with a central channelway or canal 6, and on each side of the central canal, are arranged two series of water-tight compartments 3, for submerging the barge.

2, is the apron for intercepting the volume of flowing water.

4, are two wings hinged to the front end of the canal walls and in inoperative relation occupying a triangular position, as clearly shown in Fig. 2. The wings 4, are held in contact with each other by means of cords or chains 4$^a$, wound on a controller drum on the deck 1$^a$, of the appliance and operated by a hand-wheel 5, as clearly shown in Figs. 1 and 2, whereby through the turning of the hand-wheel 5, the wings either occupy the position shown in Fig. 2, to deflect the flowing water, in volume, along and from the walls of the wings and outward therefrom through the side-ways 10, on both sides, or when the wings are spread apart, of the water in volume flowing into the canal 6, past the guard or screen 20, when the gate 7, by means of the lever-arm 7$^a$, is operated to cause this gate to assume the dotted outline position of Fig. 2, so as to permit unretarded the flow in volume of the water rearwardly to the under-shot or turbine operating wheel 8, for revolving the same. This wheel is provided on one or both ends of the shaft 8$^a$, with a pulley or pulleys 8$^b$, for a belting, not shown, for driving electric generators, machinery or other plants therefrom, by the permitted natural flow of the water in volume to the said operating wheel 8. The wheel 8, is housed from the deck 1$^a$, of the barge as shown in Fig. 1, in which access thereto is had by means of a door 17, for making repairs or for other purposes.

9, is an outlet arranged in rear of the wheel 8, for the water, after passing and spending its force on the wheel 8, so as to free itself from the canal of the barge.

11, are steering sweeps located in the front at both corners of the barge for guiding the barge, when not in actual operation to a required position, in a body of water.

12, are lee-boards for use in steadying the barge while anchored and during the moving of the same, to a working position.

13, is a chuck and cleat, for mooring a cable.

14, is a capstan located in rear of the deck 1$^a$, for operating the cables.

15, is a series of preferably ball-valve operating pumps, with screened bottoms, one only being shown, for pumping water into the water-tight compartments 3, located on both sides of the central canal 6, to thereby fill said compartments to submerge the barge, and likewise to steady the same. When so submerged and steadied by the submerging is permitted the natural flow of water, in volume, to the operating wheel 8, for revolving this wheel and thereby the power is generated therefrom and conveyed to the pulley or pulleys 8$^b$, and belting, not shown, to actuate a distant plant, generator or other machinery.

18, are side spars or piling for ballasting the barge while in operation.

19, is a log passing around a drum 19$^a$, for ascertaining the velocity of the water or force of the water in volume, per square foot of current at any point, while the barge is in operation, or is being so placed as to be operated, for generating initially certain power therefrom.

21, is a guard or platform boom located beyond the front of the barge 1, to prevent trees or other long foreign matter being drawn into contact with the wings 4, of the barge, to destroy their usefulness or in more or less broken up condition, to clog the entrance to the canal 6, and possibly thereby interfere with the natural force of the water, in volume, to the operating wheel 8, through the clogging of the screened guard 20, intended to protect the movable wing gate 7, from just such reaching the operating wheel 8.

Having thus described the nature and objects of my invention, what I claim as new and desire to secure by Letters Patent is:—

1. A barge provided with water-tight compartments located on both sides of a central canal adapted to be closed at one end by wings, said barge having outwardly flaring forward portions, said wings being pivoted at the inner ends of said flaring portions and said flaring portions being provided with transverse outlets, for the purpose set forth and means in said canal operated to transmit the power derived therefrom, to distant mechanism.

2. A barge provided with water-tight compartments located on both sides of a central canal adapted to be closed at one end by wings, said barge having outwardly flaring forward portions, said wings being pivoted at the inner ends of said flaring portions and said flaring portions being provided with transverse outlets, for the purpose set forth, a water operated wheel in said canal in rear of said wings and means operated by said wheel for transmitting the power thereof to distant mechanism.

3. A barge provided with water-tight compartments located on both sides of a central canal adapted to be closed at one end by wings, said barge having outwardly flaring forward portions, said wings being pivoted at the inner ends of said flaring portions and said flaring portions being provided with transverse outlets, for the purpose set forth, a guard located in rear of said wings, a wing-gate located adjacent thereto, means in said canal in rear of said gate and operating to transmit the derived power therefrom to distant mechanism and means located on the deck of said barge for operating said gate.

4. A barge provided with water-tight compartments located on both sides of a central canal adapted to be closed at one end by wings, said barge having outwardly flaring forward portions, said wings being pivoted at the inner ends of said flaring portions and said flaring portions being provided with transverse outlets, for the purpose set forth, a guard located in rear of said wings, a wing-gate located adjacent thereto, means in said canal in rear of said gate and operating to transmit the derived power therefrom to distant mechanism, means located on the deck of said barge for operating said gate, and means adapted to be operated from one portion of said barge for steadying the operations of the same.

5. A barge provided with water-tight compartments located on both sides of a central canal normally open at one end and at the other adapted to be closed by wings, said barge having outwardly flaring forward portions, said wings being pivoted to the inner ends of said flaring portions and the latter being provided with transverse outlets for the purpose set forth, a movable gate adjacent to said wings, means in said canal operated to transmit the power therefrom to distant mechanism and means on the sides of said barge for steadying the operations of the same.

6. A barge provided with water-tight compartments located on both sides of a central canal normally open at one end and at the other adapted to be closed by wings, said barge having outwardly flaring forward portions, said wings being pivoted to the inner ends of said flaring portions and the latter being provided with side deflecting ports closable by said wings, a water operated wheel in said canal and operating means in connection therewith to transmit the power therefrom to distant mechanism and means operative from said barge to thereby steady the operations of the same.

7. A barge provided with water-tight compartments located on both sides of a central canal normally open at one end and at the other adapted to be closed by wings, said barge having outwardly flaring forward portions, said wings being pivoted to the inner ends of said flaring portions and the latter being provided with side deflecting ports closable by said wings, a water operated wheel in said canal and operating means in connection therewith to transmit the power therefrom to distant mechanism, means operative from said barge to thereby steady the operations of the same and steering-means having the actuating device thereof so arranged as to be operated from the deck of said barge, substantially as and for the purposes set forth.

NELSON W. JAMESON.

Witnesses:
ISABELLA JAMESON,
WILLIAM A. WARRINGTON.